US005517630A

United States Patent [19]

Tasaki

[11] Patent Number: 5,517,630
[45] Date of Patent: May 14, 1996

[54] ELECTRONIC APPARATUS FEATURING A PLURALITY OF SELECTABLE MEMORIES

[75] Inventor: Shigemitsu Tasaki, Kawasaki, Japan

[73] Assignee: Canon Kabushiki Kaisha, Tokyo, Japan

[21] Appl. No.: 262,379

[22] Filed: Jun. 20, 1994

Related U.S. Application Data

[63] Continuation of Ser. No. 918,129, Jul. 23, 1992, abandoned, which is a continuation of Ser. No. 542,065, Jun. 22, 1990, abandoned.

[30] Foreign Application Priority Data

Jun. 29, 1989 [JP] Japan ..................... 1-168960

[51] Int. Cl.$^6$ ..................... G06F 12/00; G11C 11/00
[52] U.S. Cl. ................ 395/405; 365/230.03; 365/230.06
[58] Field of Search ................ 365/94, 104, 230.03, 365/230.06; 395/400, 425, 405; 364/200 MS File, 900 MS File; 371/10.2

[56] References Cited

U.S. PATENT DOCUMENTS

| 3,748,653 | 7/1973 | Debruyne et al. ............... 364/200 |
| 4,319,343 | 3/1982 | Powell ............................ 365/196 |
| 4,368,515 | 1/1983 | Nielsen ........................... 364/200 |
| 4,485,457 | 11/1984 | Balaska et al. ................. 364/900 |
| 4,617,650 | 10/1986 | Morino et al. .................. 365/195 |
| 4,802,119 | 1/1989 | Heene et al. .................... 395/400 |
| 4,809,234 | 2/1989 | Kuwashiro .................. 365/230.03 |
| 4,866,671 | 9/1989 | Yokoyama ....................... 364/900 |
| 4,905,200 | 2/1990 | Pidsosny et al. ........... 365/230.03 |
| 4,961,172 | 10/1990 | Shubat et al. .............. 365/230.03 |
| 5,241,662 | 8/1993 | Maniwa et al. ................ 395/425 |

FOREIGN PATENT DOCUMENTS

| 136416A3 | 2/1984 | European Pat. Off. . |
| 58-203560 | 11/1983 | Japan . |

Primary Examiner—Jack A. Lane
Attorney, Agent, or Firm—Fitzpatrick Cella Harper & Scinto

[57] ABSTRACT

An electronic apparatus having read-only memories (ROMs), wherein a second ROM having a region capable of being read with addresses common to a part of an address region of a first ROM can be connected. Reading from addresses included within the address region of the first ROM is performed from the second ROM when the addresses are also included within the address region of the second ROM, and from the first ROM for other cases. Furthermore, the first ROM can be replaced with a third ROM, to which addresses not overlapped with those of the second ROM are assigned.

5 Claims, 5 Drawing Sheets

ELECTRONIC APPARATUS FEATURING A PLURALITY OF SELECTABLE MEMORIES

This application is a continuation of application Ser. No. 07/918,129 filed Jul. 23, 1992, now abandoned, which is a continuation of U.S. patent application Ser. No. 07/542,065 filed Jun. 22, 1990, which is now abandoned.

BACKGROUND OF THE INVENTION

1. Field of the Invention

This invention relates to an electronic apparatus having a microprocessor unit (MPU) and a plurality of read-only memories (ROMs) having common address regions.

2. Description of the Prior Art

There have been a large number of apparatuses using MPUs. The control circuit for each of these apparatuses comprises in gross a MPU, a ROM, a random access memory (RAM), a timer, an I/O port, a driver and the like. Among these components, the ROM is used as a main unit for controlling the apparatus. Its storage contents include various elements, such as control codes for the apparatus, a character generator, tables and the like.

In an electronic apparatus having a ROM, when control codes, a character generator, tables and the like are stored in the ROM and the apparatus is operated, if there is any bug in a part of these elements, there may arise a need to deal with the bug by promptly correcting in case the number of the bugs is large.

If there is any problem, for example, in a control code, a case may arise in which the apparatus can not perform a normal operation and causes excursion. If there is any bug in a character generator, troubles, such that correct characters are not output, may arise. Therefore, prompt countermeasures are required, particularly, for example, after the apparatus has been shipped to the market. As a countermeasure, in most cases, a ROM in which a problem has occurred is replaced with a new ROM in which the problem has been corrected.

On the other hand, in accordance with the recent trend toward a large-capacity ROM, control codes, a character generator and the like, which have previously been stored in separate ROMs, now can be stored in a much smaller number of ROMs by storing a certain group of these elements in a single ROM, or even all of these elements. Furthermore, ROMs have been modified by changing masks because of the absence of erasable programmable ROMs (EPROMs) having large capacity and the need for cost reduction. Since a drastic cost reduction and a reduction in the size of a substrate due to a reduction in the number of components can be expected, as described above, ROMs having still larger capacity have recently been used.

Under such circumstances, however, if there is any bug in a ROM as described above, there are problems in that no EPROM for replacing the ROM exists if the ROM produced by certain masks has a large capacity, and about two months are needed for providing a new ROM by changing masks. Hence, a prompt countermeasure cannot be taken.

If an EPROM having large capacity existed, the ROM would be able to be promptly replaced with the EPROM. However, the cost for the EPROM is much higher than the cost for a masked ROM. Hence, the cost for the replacement drastically increases.

SUMMARY OF THE INVENTION

It is an object of the present invention to provide an electronic apparatus which can simply deal with a defect produced in a part of the contents stored in a ROM.

It is another object of the present invention to provide an electronic apparatus which can substitute only a portion of the stored contents of a ROM, where a defect has been produced, for another ROM, and which can use remaining portions of the original ROM.

It is still another object of the present invention to provide an electronic apparatus which can substitute a part of the stored contents of a ROM for another ROM capable of being read with identical addresses, and which can expand an address space by replacing the original ROM with a third ROM and assigning new addresses for the third ROM.

According to one aspect, the present invention which achieves these objectives relates to an electronic apparatus comprising a first read-only memery for storing information, a second read-only memory for storing information having a storage region sharing common addresses with the first read-only memory, reading means for reading information stored in a desired address from the first or second read-only memory, and selection means for selecting a read-only memory to be read by the reading means.

According to another aspect, the present invention relates to an electronic apparatus comprising first connection means for connecting a first read-only memory, second connection means for connecting a second read-only memory, reading means for reading information stored in a desired address from the first or second read-only memory, first control means for controlling so as to read from the read-only memory connected to the first connection means and the read-only memory connected to the second connection means with partly common addresses, second control means for controlling so as to read from the read-only memory connected to the first connection means and the read-only memory connected to the second connection means with unoverlapped addresses, and selection means for selecting the read-only memory to be read from by the reading means.

Other objectives and advantages, besides those discussed above, shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

DESCRIPTION OF THE PREFERRED EMBODIMENTS

Figure 1:
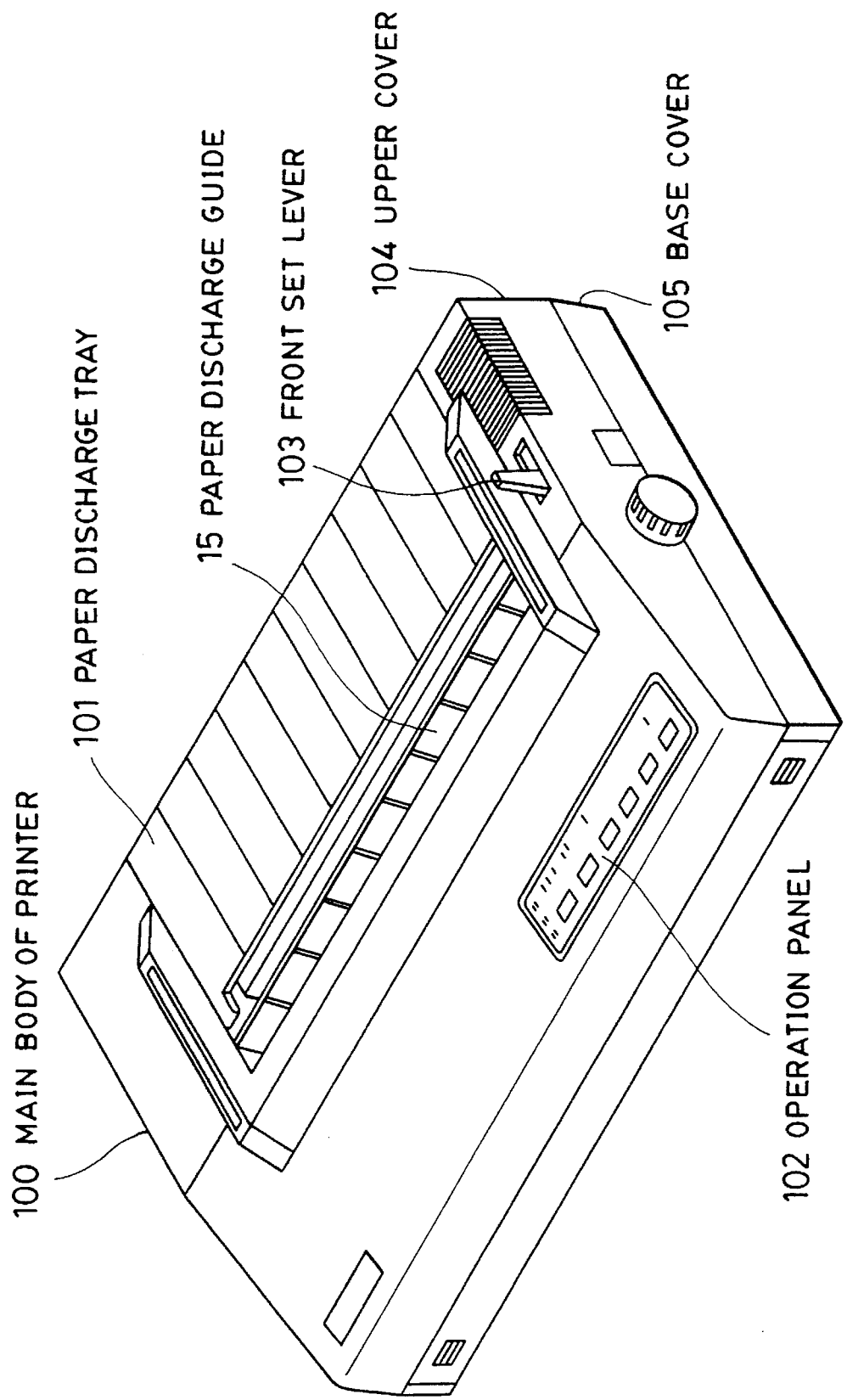
FIG. 1 is a drawing showing a printer according to an embodiment of the present invention.

FIG. 1 is a drawing showing a printer serving as an apparatus according to an embodiment of the present invention. A ROM incorporating control codes for operating the printer and a character generator is mounted on a printed circuit board within a main body 100 of the printer. There are also shown an upper cover 104 and a base cover 105.

Figure 2:
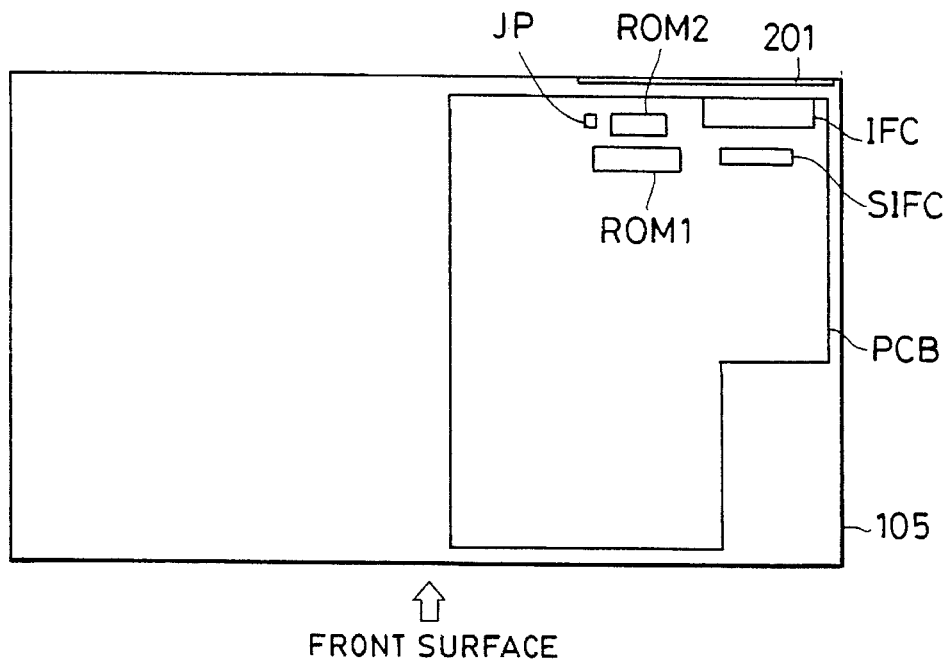
FIG. 2 is a diagram showing the arrangement of respective components on a printed circuit board.

FIG. 2 is a top plan view of a printed circuit board PCB mounted on the base cover 105, and shows a mounted ROM. In the present embodiment, a detachable rear cover 201 is provided on the rear surface of the main body of the printer. If the rear cover 201 is detached, an optional PCB for an interface (I/F) (for example, a serial I/F card) can be mounted to a connector SIFC. Furthermore, a ROM1 storing control codes and a character generator mounted on the printed circuit board PCB, and a ROM2 mountable whenever necessary can be easily mounted. A jumper plug JP, serving as a switching means between the ROM1 and the ROM2, is also arranged at a position capable of being switched by hand. The ROM2 is configured so as to be more easily mounted by a socket or the like.

There is also shown an interface connector IFC (for example, a parallel interface).

Figure 3:
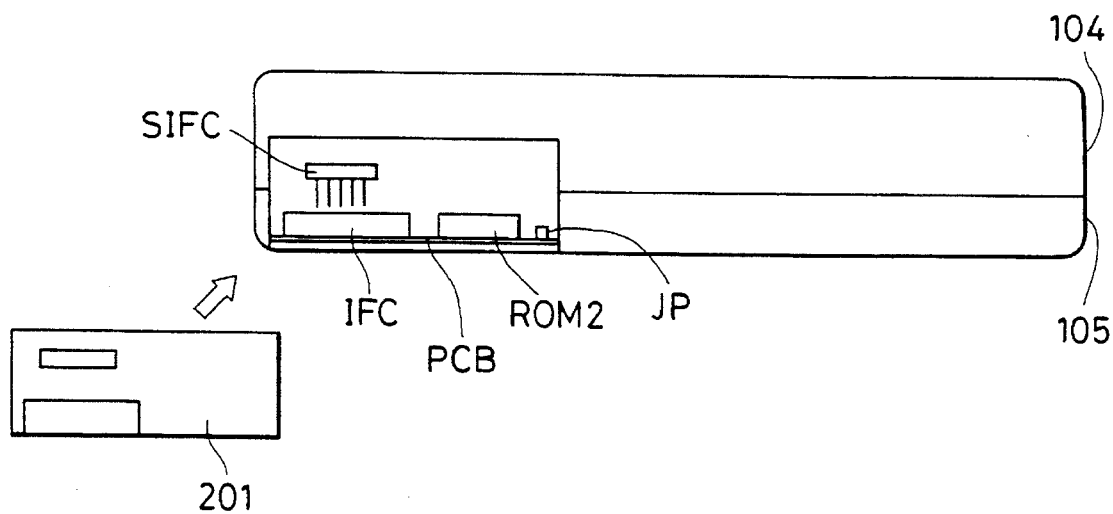
FIG. 3 is a rear elevation of the printer of the embodiment.

FIG. 3 is a drawing of the main body 100 of the printer as seen from behind, and shows a state in which the ROM2 is mounted. If the rear cover 201 is detached, the interface connector IFC, the optional interface connector SIFC, the ROM2 and the jumper plug JP for switching which is mounted on the printed circuit board PCB appear close at hand, and can be easily mounted and switched by hand.

Figure 4:
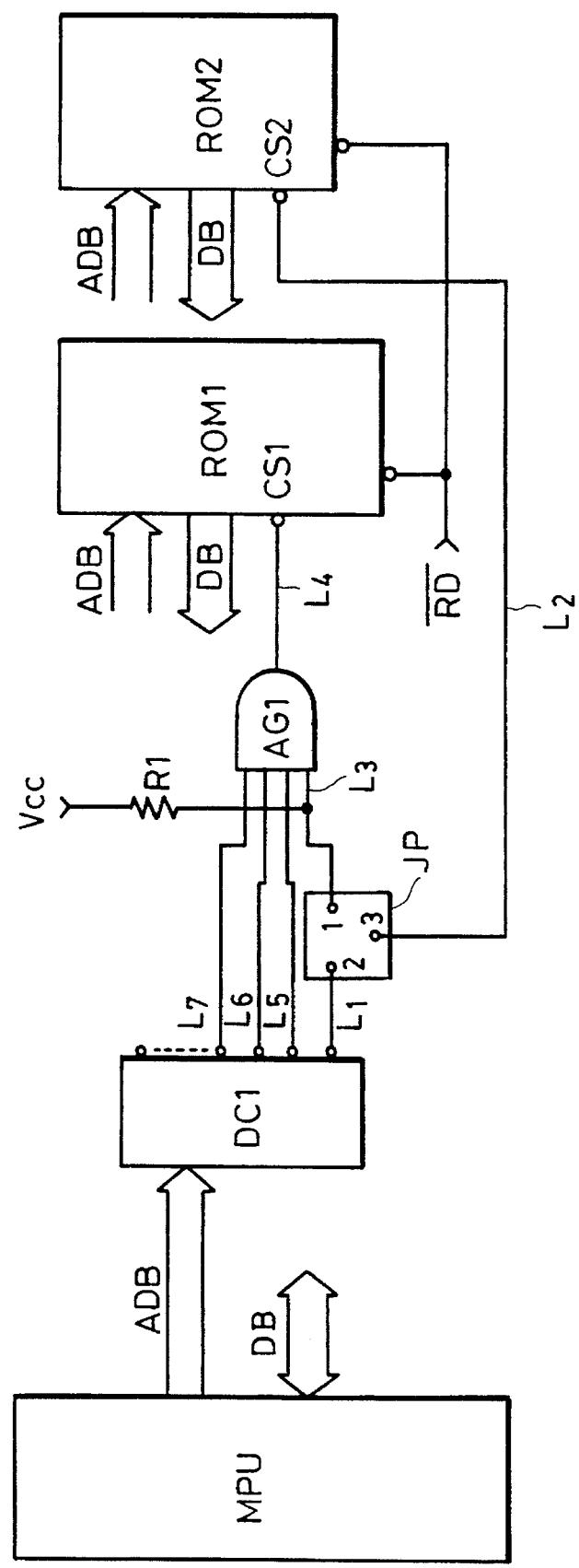
FIG. 4 is a block diagram of circuitry for switching between two ROMs in the embodiment.

FIG. 4 shows circuitry for providing common addresses to the ROM1 and the ROM2, and switching therebetween. Address bus ADB of a MPU is input to a decoder DC1, and the ROM1 and the ROM2 are subjected to chip selection according to a decoded output from the decoder DC1. That is, the operation of the ROM1 and the ROM2 is switched by a switching operation of the switching means (jumper plug JP) for the ROM1 and the ROM2.

Figure 6:
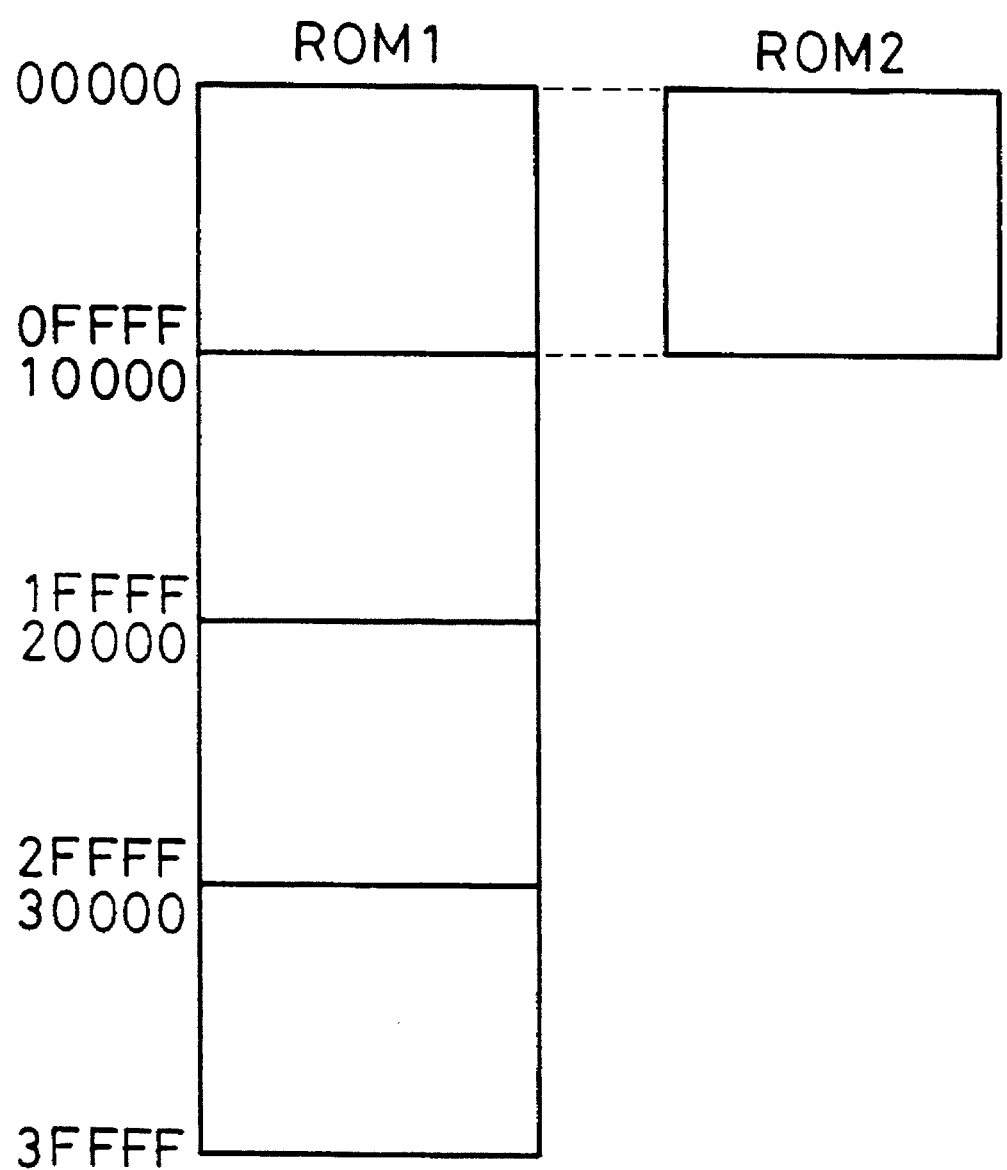
FIG. 6 is a diagram showing address regions in two ROMs.

FIG. 6 shows the structure of addresses in the ROM1 and the ROM2. In the present embodiment, the contents of the ROM2 correspond to and have the same address region as the first 512K(kilo)-bit (0000–FFFF) region within the 2M(mega)-bit region of the ROM1.

In the above-described configuration, the printer 100 uses the 2M-bit mask ROM (ROM1), in addresses from 0000 to FFFF of which are stored control codes (control ROM) for operating the apparatus, and in addresses from 10000 to 3FFFF of which are stored codes of the character generator. If there is any bug in the portion of the control ROM in the ROM1, the ROM2 is mounted, and by switching of the jumper plug JP, the printer operates by the control of the ROM2.

That is, in the circuit configuration (see FIG. 4), address bus ADB from the MPU is input to the decoder DC1, where signals are decoded in respective 512K-bit address regions. Among output signals on lines $l_1$, $l_5$, $l_6$ and $l_7$ (lines $l_1$, $l_5$, $l_6$ and $l_7$ correspond to addresses 0000–FFFF, 10000–1FFFF, 20000–2FFFF and 30000–3FFFF, respectively) from the decoder DC1, signals on lines $l_5$–$l_7$ are directly input to an AND gate AG1. Line $l_1$ is usually connected to line $l_3$ since terminals 1 and 2 are connected together via the jumper plug JP, and a signal on line $l_3$ is input to the AND gate AG1. A signal on output line $l_4$ from the AND gate AG1 is input to a chip select terminal CS1 of the ROM1. The ROM1 thereby operates, and outputs contents of the input signal to the data bus DB when a read signal $\overline{RD}$ is input to the ROM1.

The jumper plug JP usually connects between the terminals 1 and 2 to operate the ROM1 as described above. If there is any bug in the control ROM, an immediate counter measure can be taken by switching the jumper plug JP and mounting the ROM2. That is, by mounting the ROM2 and connecting together terminals 2 and 3 of the jumper plug JP while disconnecting terminals 1 and 2, line $l_1$ for the decoded output from addresses 0000 to FFFF is connected to line $l_2$, and a signal on line $l_1$ is input to a chip select terminal CS2 of the ROM2. Contents of the input signal are output to the data bus DB by an input of the signal $\overline{RD}$, and the ROM2 thereafter operates. Since the disconnected line $l_3$ is connected to $V_{cc}$ via a resistor R1, the output from the AND gate AG1 is equal to that when signals on lines $l_5$, $l_6$ and $l_7$ are decoded. Hence, the electronic apparatus according to the present invention operates using the ROM2 as the control ROM and the ROM1 as the character generator.

The circuit configuration has now been explained. The mounting of the ROM2 and the switching of the jumper plug JP can be easily performed if the rear cover of the printer 100 is detached as described above. The detachable rear cover is necessary for mounting the optional interface, and its structure is used also for the mounting of the ROM2 and the switching of the jumper plug JP. Since the rear cover is not provided exclusively for the mounting of the ROM2 and the switching of the jumper plug JP, a costly change in structure is not needed for realizing the present invention.

Since the mounting and switching of the ROM2 from the ROM1 becomes possible as described above, a prompt counter measure can be taken, and a drastic increase in cost can be prevented.

Figure 5:
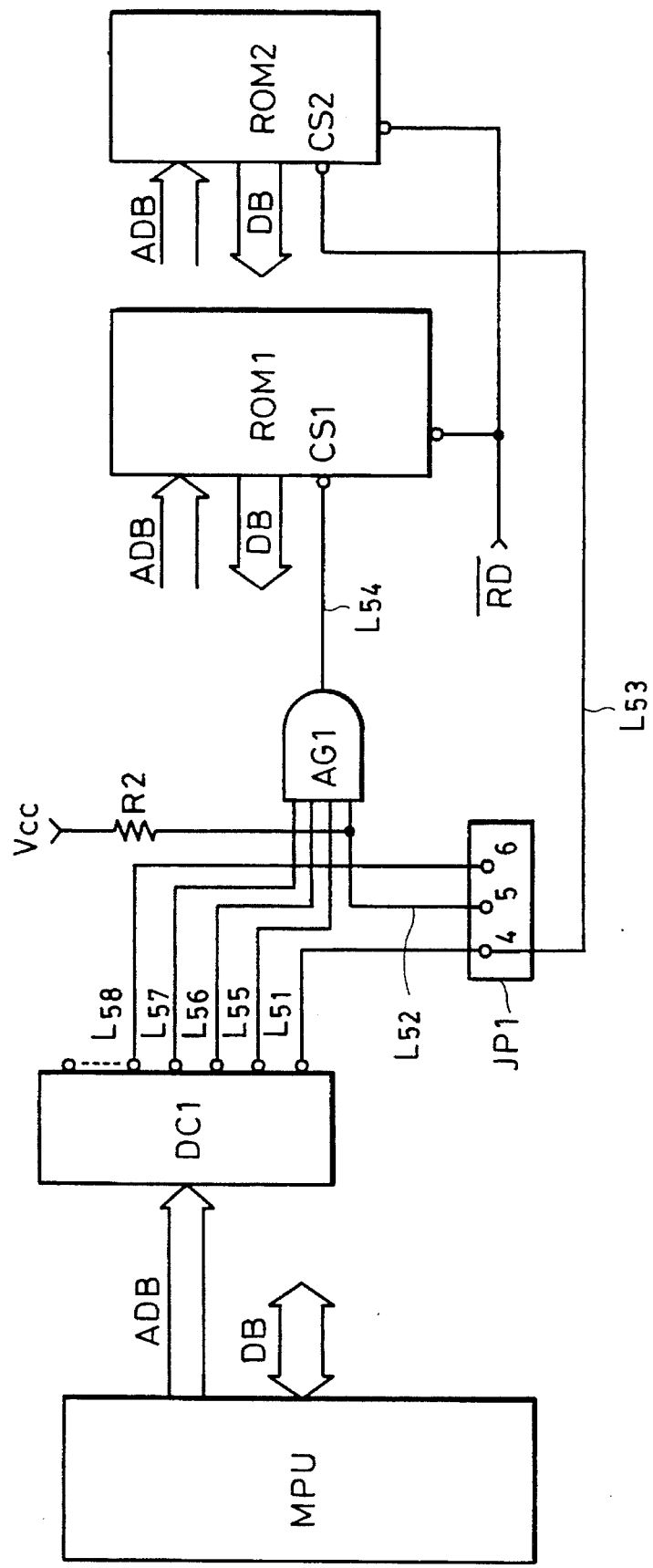
FIG. 5 is a block diagram of circuitry for switching between two ROMs in another embodiment.

FIG. 5 is a block diagram of a second embodiment. In the second embodiment, after a part of the functions of the ROM1 has been replaced with the ROM2, the entire region of the ROM1 can be utilized.

In the first embodiment, addresses 0000–FFFF are common, and portions which can be used as the ROM1 after switching by the jumper plug JP are addresses 1FFFF–3FFFF. In the second embodiment, the entire region of the 2M-bit ROM1 can be used as addresses 1FFFF–4FFFF. Hence, in addition to a countermeasure for a bug, expansion in the ROM region, such as expansion of the character generator or the like, can be easily performed.

The second embodiment will now be explained by reference to the circuitry shown in FIG. 5. As in FIG. 4, in FIG. 5, inputs from a MPU via address bus ADB are decoded by a decoder DC1 in respective 512K-bit address regions. Among output signal lines $l_{51}$, $l_{55}$, $l_{56}$, $l_{57}$ and $l_{58}$ (lines $l_{51}$, $l_{55}$, $l_{56}$, $l_{57}$ and $l_{58}$ correspond to addresses 0000–FFFF, 10000–1FFFF, 20000–2FFFF, 30000–3FFFF and 40000–4FFFF, respectively) from the decoder DC1, lines $l_{55}$, $l_{56}$ and $l_{57}$ are directly input to the AND gate AG1, and line $l_{51}$ is usually connected to line $l_{52}$ by connecting together terminals 4 and 5 via a jumper plug JP1 and a signal on line $l_{51}$ is input to the AND gate AG1. Line $l_{58}$ will be described later.

A signal on output signal line $l_{54}$ from the AND gate AG1 is input to a chip select terminal CS1 of the ROM1. The ROM1 thereby operates, and output contents corresponding to the input signal is output to the data bus DB when a read signal $\overline{RD}$ is input.

As described above, the jumper plug JP1 usually connects between the terminals 4 and 5 to perform the above-described operation. An explanation will now be provided of a case in which, when any bug is found in the control ROM (addresses 0000–FFFF), a countermeasure is taken by mounting the ROM2 and switching the jumper plug JP1, as in the first embodiment.

In the second embodiment, by always connecting line $l_{51}$ to line $l_{53}$, line $l_{51}$ is connected to a chip select terminal CS2 of the ROM2 from the beginning. In the above-described usual case in which the ROM2 is not mounted, there is no influence by the ROM2. When the ROM2 is mounted, if the terminals 4 and 5, which are usually connected, are disconnected, since line $l_{51}$ is originally input to the chip select terminal CS2 via line $l_{53}$, the ROM2 operates by an input of the signal $\overline{RD}$ and outputs contents corresponding to the input signal to the data bus DB. The ROM2 thereafter performs its control operation. Since the disconnected line $l_{52}$ is connected to $V_{cc}$ via a resistor R2, the output from the AND gate AG1 is equal to that when signals on lines $l_{55}$, $l_{56}$ and $l_{57}$ are decoded, as in the first embodiment. Hence, the electronic apparatus according to the present invention operates using the ROM2 as the control ROM and the ROM1 as the character generator.

If terminals 5 and 6 are connected together in the jumper plug JP1 in which the terminals 4 and 5 are disconnected, a signal on line $l_{58}$ can be input to the AND gate AG1, and a signal on line $l_{51}$ is input to the chip select terminal CS2 of the ROM2 via line $l_{53}$. Hence, addresses 0000 –FFFF in the ROM2 and addresses 10000–4FFFF in the ROM1 are utilized at this time, and expansion of a ROM can be easily performed by this switching. That is, by the above-described switching of the jumper plug JP1, signals on lines $l_{55}$, $l_{56}$, $l_{57}$ and $l_{58}$ are input to the AND gate AG1. The chip select terminal CS1 of the ROM1 is selected by an output signal on line $l_{54}$ from the AND gate AG1, and the chip select terminal CS2 of the ROM2 is selected by a signal on line $l_{51}$. Hence, the two ROMs can operate in the above-described address regions. By replacing the ROM1 with the other 2M-bit ROM not having a control unit (for example, a ROM having only codes for a character generator), the entire region in the ROM1 can be utilized.

Although, in the above-described embodiments, an explanation has been provided assuming that a ROM to be switched is a control ROM, a switching operation for other functions may of course be executed in a similar manner. A similar switching operation may, for example, be performed for a change of a character generator, a table or the like. Furthermore, address regions to be switched are not limited to those described in the above-described embodiments, but any other addresses may be switched.

Moreover, an address region to be switched from a first ROM may be shared by a plurality of ROMs.

As described above, in the recent trend toward the use of ROMs having large capacity and mask ROMs, by arranging so that another ROM can be mounted and the operation can be switched between the two ROMs by a simple switching means for regions (particularly, a control ROM or the like) subject to frequent changes within regions of the ROM being used, a countermeasure for an emergent change can be immediately executed while leaving the original ROM as it is. Furthermore, since the switched regions correspond to a part of the large capacity of the ROM, a drastic increase in cost can be prevented.

In addition, by making the capacity of the original ROM operable as a result of the shift of the control operation to the other ROM mounted whenever necessary, the region of the ROM can be expanded.

Moreover, by positively utilizing the switching operation, the ROM to be subsequently mounted may be the other emulation ROM as an option setting to expand application fields.

What is claimed is:

1. An electronic apparatus comprising:

a first read-only memory fixedly connected to said apparatus for storing information and having a plurality of address regions in a single chip structure;

a second read-only memory detachably connected to said apparatus for storing information and having an address region in common with one of the plurality of address regions in said first read-only memory;

address decoding means for decoding a received address and outputting a select signal on one of a first and a second signal line, wherein said address decoding means outputs the select signal on the first signal line when the received address is in the common address region and outputs the select signal on the second signal line when the received address is in the plurality of address regions other than the common address region, and wherein the second signal line is electrically connected to said first read-only memory;

manual switch means for electrically connecting the first signal line with one of said first and second read-only memories, alternatively; and reading means for reading out information from one of said first and second read-only memories selected by the select signal.

2. The electronic apparatus according to claim 1, wherein an address region of said second read-only memory is a subset of an address region of said first read-only memory.

3. An electronic apparatus comprising:

first connection means for fixedly connecting to said apparatus a first read-only memory for storing information and having a plurality of address regions in a single chip structure;

second connection means for detachably connecting to said apparatus a second read-only memory for storing information and having an address region in common with one of the plurality of address regions in said first read-only memory;

address decoding means for decoding a received address and outputting a select signal on one of a first and a second signal line, wherein said address decoding means outputs the select signal on the first signal line when the received address is in the common address region and outputs the select signal on the second signal line when the received address is in the plurality of address regions other than the common address region, and wherein the second signal line is electrically connected to said first read-only memory;

manual switch means for electrically connecting the first signal line with one of said first and second read-only memories, alternatively; and control means for controlling said apparatus so as to read information from the memory supplied with the select signal via one of said first and second connection means.

4. The electronic apparatus according to claim 3, wherein, under the control of said control means, an address region of the second read-only memory connected to said second connection means is a subset of an address region of the first read-only memory connected to said first connection means.

5. A method for reading out information from first and second read-only memories, the first read-only memory, fixedly connected to an electronic apparatus, having a plurality of address regions in a single chip structure, and the second read-only memory, detachably connected to the electronic apparatus, having an address region in common with one of the plurality of address regions in the first read-only memory, said method comprising the steps of:

attaching the second read-only memory to the apparatus;

electrically connecting a first output line of an address decoder with the second read-only memory by means of a manual switch, wherein a second output line of the decoder is electrically connected with the first read-only memory;

requesting to read out information from a desired address;

decoding the desired address and outputting a select signal on one of the first and the second output line by means of the address decoder, wherein the address decoder outputs the select signal on the first output line when the desired address is in the common address region and outputs the select signal on the second output line when the desired address is in the plurality of address regions other than the common address region; and reading out information stored in the desired address of the read-only memory supplied with the select signal.

* * * * *